(12) United States Patent
Leimann (10) Patent No.: US 10,281,044 B2
(45) Date of Patent: May 7, 2019

(54) LUBRICANT-CONDUCTING X-RING

(71) Applicants: ZF Friedrichshafen AG, Friedrichshafen (DE); ZF WIND POWER ANTWERPEN N.V., Lommel (BE)

(72) Inventor: Dirk Leimann, Edegem (BE)

(73) Assignees: ZF Friedrichshafen AG, Friedrichshafen (DE); ZF Wind Power Antwerpen N.V., Lommel (BE)

( * ) Notice: Subject to any disclaimer, the term of this patent is extended or adjusted under 35 U.S.C. 154(b) by 209 days.

(21) Appl. No.: 15/111,497

(22) PCT Filed: Dec. 15, 2014

(86) PCT No.: PCT/EP2014/077710
§ 371 (c)(1),
(2) Date: Jul. 14, 2016

(87) PCT Pub. No.: WO2015/106901
PCT Pub. Date: Jul. 23, 2015

(65) Prior Publication Data
US 2016/0334004 A1    Nov. 17, 2016

(30) Foreign Application Priority Data

Jan. 17, 2014  (DE) .................. 10 2014 200 863

(51) Int. Cl.
| *F16J 15/3236* | (2016.01) |
| *F16N 21/00* | (2006.01) |
| *F03D 80/70* | (2016.01) |

(52) U.S. Cl.
CPC .......... *F16J 15/3236* (2013.01); *F03D 80/70* (2016.05); *F16N 21/00* (2013.01);
(Continued)

(58) Field of Classification Search
CPC ...... F16J 15/025; F16J 15/183; F16J 15/3236; F16J 15/40
See application file for complete search history.

(56) References Cited

U.S. PATENT DOCUMENTS 3,907,307 A * 9/1975 Maurer ................. F04B 53/164
277/513
4,301,893 A * 11/1981 St. Jean .................... F16J 15/40
184/24
(Continued)

FOREIGN PATENT DOCUMENTS

| DE | 2 119 468 | 10/1972 |
| DE | 196 34 762 A1 | 3/1997 |

(Continued)

OTHER PUBLICATIONS

German Search Report Corresponding to 10 2014 200 863.8 dated Jul. 8, 2014.
(Continued)

*Primary Examiner* — Nicholas L Foster
(74) *Attorney, Agent, or Firm* — Davis & Bujold PLLC; Michael J. Bujold (57) ABSTRACT

A lubrication conducting element has first and second side parts, each of which creates a sealing lip. The first side part extends to the intermediate part and the second side part extends to the intermediate part. The first and second side parts and the intermediate part form a first cavity with a first opening. Third and fourth side parts each creates a sealing lip. The third side part extends to the intermediate part and the fourth side part extends to the intermediate part. The third and fourth side parts and the intermediate part form a second cavity with a second opening. A hole in the intermediate part facilitates lubrication flow between the first and second cavities. The side parts, the sealing lips, the inter-
(Continued)

mediate part, the cavities and the openings extend rotationally symmetric around a common symmetric axis.

10 Claims, 6 Drawing Sheets

(52) U.S. Cl.
CPC . *F05B 2240/57* (2013.01); *F05B 2260/40311* (2013.01); *F05B 2260/98* (2013.01); *Y02E 10/72* (2013.01)

(56) References Cited

U.S. PATENT DOCUMENTS

| | | | | |
|---|---|---|---|---|
| 5,022,660 | A | * | 6/1991 | Dunford ................ F16J 15/183 277/528 |
| 5,076,589 | A | * | 12/1991 | Marsi ..................... F16J 15/006 277/319 |
| 5,411,609 | A | * | 5/1995 | Karoake ................. B21B 1/166 148/325 |
| 5,791,193 | A | | 8/1998 | Uematsu et al. |
| 7,214,157 | B2 | | 5/2007 | Flamang et al. |

FOREIGN PATENT DOCUMENTS

| | | |
|---|---|---|
| DE | 199 16 106 A1 | 10/2000 |
| DE | 603 07 608 T2 | 10/2007 |
| DE | 10 2009 018 786 A1 | 10/2009 |
| EP | 1 488 139 B1 | 8/2006 |
| EP | 1 767 814 A2 | 3/2007 |
| GB | 1 312 199 | 4/1973 |
| JP | H10-169648 A | 6/1998 |
| WO | 2011/050837 A1 | 5/2011 |

OTHER PUBLICATIONS

International Search Report Corresponding to PCT/EP2014/077710 dated Feb. 20, 2015.
Written Opinion Corresponding to PCT/EP2014/077710 dated Feb. 20, 2015.

* cited by examiner

LUBRICANT-CONDUCTING X-RING

This application is a National Stage completion of PCT/EP2014/077710 filed Dec. 15, 2014, which claims priority from German patent application serial no. 10 2014 200 863.8 filed Jan. 17, 2014.

FIELD OF THE INVENTION

The invention concerns a lubricant conductive.

BACKGROUND OF THE INVENTION

Such elements are used to guide lubricant material between two transmission parts, whereby one of the transmission parts is positioned rotationally fixed and the other transmission part rotates. Both transmission parts have each a lubricant material duct. The lubricant conductive element serves to establish a lubricant conductive connection between both lubricant material ducts.

Known through the publication EP 1 488 139 A1 is a lubricant conducting ring with a U-shape cross section. The ring connects two, lubricant conducting and counter rotating, transmission parts. The ring is fixed, connected with the first transmission part. A second transmission part has a circumferential groove. The ring engages into it in a way so that the ring creates a cavity with the groove. The cavity serves to direct lubricant material between a first lubricant material duct which leads into the ring, and the lubricant material duct which leads into the groove.

The invention described in publication EP 1 488 139 A1 is a lubricant conductive connection that can support pressures from about 1 to 1.5 bar. However, in wind power transmissions, hydrostatic slide bearings are increasingly used. Their lubrication requires pressure of much more than 1.5 bar. Therefore, the hydrostatic slide bearings in wind power transmissions are usually lubricated with a pressure in the area of 6 bar.

In addition, the load applied to the transmission of a wind power installation causes strong translational, relative movements between the named transmission parts. The lubricant material conducting ring, as described in the publication EP 1 488 139 A1 is not in a position to compensate for these relative movements and therefore, leakages occur.

SUMMARY OF THE INVENTION

It is the object of the invention to connect two transmission parts, in particular transmission parts of a wind power installation, whereby at least one of the transmission parts is rotatably positioned, through avoiding the known state-of-the-art solutions and their inherent disadvantages. The connection shall withstand in particular a high lubricant material pressure.

An inventive lubricant material conducting element has a first side part which creates a sealing lip, and a second side part which creates a second sealing lip. An intermediate part of the lubricant material conducting element connects the first side part with the second side part. Thus, the first side part leads into the second side part along a second cut surface into the intermediate part. Accordingly, the second side part leads along a second cut surface into the intermediate part. The first cut surface characterizes hereby a common surface of the first side part which extends through the lubricant material conducting element and the intermediate part; the second cut surface characterizes a common surface of the second side part which extends through the lubricant material conducting element and the intermediate part.

The intermediate part has at least one hole to enable the flow of the lubricant material through the intermediate part.

The first side part, the second side part, and the intermediate part are positioned in a way so that they create a first cavity. The hole in the intermediate part leads into this cavity. Therefore, the hole represents an opening of the cavity. Furthermore, the cavity has an additional opening, different from the hole as an opening or outlet, respectively. Such a cavity which has an outlet can also be characterized as recess or groove.

The first side part, the second side part, the first sealing lip, the second sealing lip, the intermediate part, the first cut surface, the second cut service, the first cavity and the first outlet extend rotationally symmetrically around a common symmetrical axis.

Up to here, the lubricant material conducting element corresponds with the known lubricant conducting ring as in EP 1 488 139 A1. The above described part of the lubricant material conducting element is therefore a ring with a U-shaped cross-section. Hereby, the first side part and the second side part create legs of the U. The bottom part of the U is created by the intermediate part.

The invention is based on the idea to mirror image the described U in its bottom. Therefore, a ring shaped element is created where its cross-section has two U-shaped areas, which are mirror symmetrical to each other and have a common bottom. Thus, the lubricant material conducting element is in a position, to compensate for the translational relative movements between the transmission parts with a doubled amplitude. It is also possible to reduce the bottom U section, so that the shape of the cross section gets close to an X. It improves, as described in the following sections, the resistance of the lubricant material conducting element against a large pressure.

In accordance with the invention, the lubricant and material conducting element has a third side part which creates a third sealing lip, and a fourth side part which creates a fourth sealing lip. The intermediate part connects not only the first side part with the second side part, but also the third side part with the fourth side part. Accordingly, the third side part extends along a third section cut into the intermediate part. The fourth side part extends along a fourth section cut into the intermediate part. The third section cut is hereby characterized as a common surface of the third side part and the intermediate part which extends through the lubricant material conducting element; the fourth section characterizes a common surface of the fourth side part and the intermediate part which extends through the lubricant material conducting element.

Preferably, the lubricant material conducting element is designed as one part.

A second cavity is created through the third side part, the fourth side part, and the intermediate part. The second cavity has a second opening or outlet, respectively, that is different from the hole. Such a cavity, provided with an outlet, can also be characterized as a recess or groove.

The first side part, the second side part, the third side part, the fourth side part, the first sealing lip, the second sealing lip, the third sealing lip, the fourth sealing lip, the first section cut, the second section cut, the third section cut, the fourth section cut, the first cavity, the second cavity, the first opening and the second opening extend rotationally symmetric around the common symmetric axis. The symmetric characteristic does not concern hereby the hole. This means that the intermediate part is rotationally symmetric around the common symmetric axis without the hole. The intermediate part is therefore created by an element which extends rotationally symmetric around the common symmetric axis, into which the hole was placed. The rotationally symmetric extending first opening and the rotationally symmetric extending second opening can also be identified as a channel.

The first sealing lip and the second sealing lip are preferably positioned in a way so that they extend along the first opening. This means that the first opening extends within a space between the first sealing lip and the second sealing lip. The first opening extends in particular between the first sealing lip and the second sealing lip. Thus, the first sealing lip and the second sealing lip create or border, respectively, the first opening.

The same applies to, mutatis mutandis (after modifications), for the second opening, the third sealing lip, and the fourth sealing lip.

Such a configuration of the two openings of the cavities and the sealing lips enable the cavities to be completely filled, meaning up to their openings, with lubricant.

The lubricant material conducting element can be positioned in different ways. In a preferred embodiment of the invention, the lubricant material conducting element is radially oriented. The lubricant flow hereby takes place in the radial direction, meaning orthogonally to the common symmetric axis. The first area of the lubricant material conducting element, comprising of the first side part, the first sealing lip, the second side part and the second sealing lip, extends hereby in the radial direction around a second area of the lubricant and material conducting element or outside, respectively, of the second area or, respectively, surrounds the second area whereby the second area comprises the third side part, the third sealing lip, the fourth side part, and the fourth sealing lip. The intermediate part is positioned between these two areas.

Such an embodiment is characterized by the fact that the first opening and the second opening have each the shape of a shell surface of a rotary cylinder and or right circle cylinder, respectively. Here the common symmetrical axis also forms the symmetrical axis of the two rotary cylinders. The diameters of both rotary cylinders are different.

Furthermore, the embodiment can be described by means of a third rotary cylinder where its symmetrical axis forms the common symmetrical axis, and its shell surface extends through the intermediate part. The first side part, the first sealing lip, the second side part and the second sealing lip are located outside of the third rotation cylinder. Located inside of the third rotation cylinder are the third side part, the third sealing lip, the fourth side part, and the fourth sealing lip. The first cavity and the first opening extend accordingly outside of the third rotary cylinder, the second cavity and the second opening inside of the third rotary cylinder.

Also, in a preferred alternative embodiment, the lubricant material conducting element is axially aligned. The lubricant flows also in the axial direction, meaning parallel to the common symmetrical axis. In this embodiment, the first side part, the first sealing lip, the second side part, and the second sealing lip are positioned on another side radially, meaning orthogonal, to the common symmetric axis, and run through the plane of the intermediate part, as the third side part, the third sealing lip, the fourth side part, and the fourth sealing lip. Accordingly, also the first cavity with the first opening and the second cavity with the second opening are present on different sides of the plane. In particular, the lubricant material and that in element is mirror symmetrical in reference to the plane. The embodiment is characterized by the fact that the first opening and the second opening have each the shape of a circular ring. Both circular rings are radially positioned, meaning that they extend orthogonal in reference to the common symmetric axis.

Preferably, the lubricant material conducting element is at least partially, preferably completely, plastic material, for instance Perbunan (NBR), EPDM, Silicone (VQM or MVQ), Viton (FPM or FKM), PTFE.

Alternatively, the lubricant material conducting element can be at least partially metal, also completely, for instance steel, copper, or aluminum.

Especially preferred is an embodiment in a mixed construction, in which the lubricant material and acting element is partially metal and partially plastic. In particular, the first sealing lip, the second sealing lip, the third sealing lip, and the fourth sealing lip, can be plastic. The remaining different areas of the lubricant material conducting elements, meaning of the first sealing lip, the second sealing lip, the third sealing lip, and the fourth sealing lip, are preferably metal. It is also possible that the first sealing lip, the second sealing lip, a third sealing lip, and the fourth sealing lip, are metal while the remaining areas of the lubricant material conducting elements are plastic.

The lubricant material conducting element is assigned as the first element of a lubricant material conducting device. The device comprises furthermore a second element with a first groove, meaning a channel, notch, or indent, and a third element with a second groove.

A first lubricant material conducting connection extends through the second element and leads into the first groove. Accordingly, a lubricant material conducting leads through the third element into the second groove.

The first side part and the second side part engage hereby with the first groove, so that the first sealing lip fits closely, along the first contact surface, and the second sealing lip, along a second contact surface at the first groove, or a wall, or surface of the first groove. The first groove, the first side part, the second side part, and the intermediate part surround hereby a third cavity which surrounds the first cavity. The first opening is located inside of the third cavity.

The third side part and the fourth side part engage hereby with the second groove, so that the third sealing lip fits closely at a third contact surface and the fourth sealing lip, along a fourth contact surface at the second groove, or a wall, or a surface of the first groove, respectively. The second groove, the third side part, the fourth side part and the intermediate part surround hereby a fourth cavity, which surrounds the second cavity. The second opening is located inside of the fourth cavity.

The device is designed in such a way that, between the first sealing lip and the first groove as well as between the second sealing lip and the first groove, no lubricant material can leak from the third cavity. Accordingly, no lubricant material can leak from the fourth cavity between the third sealing lip and the second groove as well as from the fourth sealing lip and the second groove. Thus, the first sealing lip and the second sealing lip seal the third cavity in reference to the first groove, the third sealing lip and the fourth sealing lip seal the fourth cavity in reference to the second groove.

Based on this background, it turned out to be an advantage to design the first element as a springy part so that the first side part provides a spring force towards the first groove, through the first sealing lip along of the first contact surface, and the second side part through the second sealing lip along the second contact surface, and so that the third side part provides a spring force towards the second groove through the third sealing lip, along the third contact surface and the fourth side part through the fourth sealing lip along the fourth contact surface.

The first side part, the second side part, the third side part, the fourth side part, the first sealing lip, the second sealing lip, the third sealing lip, the fourth sealing lip, the intermediate part, the first cross section, the second cross section, the third cross section, the fourth cross section, the first cavity, the second cavity, the third cavity, the fourth cavity, the first opening, the second opening, the first groove, the second groove, the first contact surface, the second contact surface, the third contact surface, the fourth contact surface, extend rotationally symmetric around a common symmetric axis.

Through the lubricant material conducting connection which extends through the second element, the lubricant material can be directed into the third cavity and therefore also into the first cavity. Since the hole in the intermediate part connects the first cavity and the second cavity with each other, it also connects lubricant with the third cavity and the fourth cavity. Thus, the lubricant material passes through the hole of the third cavity into the fourth cavity. From there, the lubricant flows through the lubricant conducting connection leading through the third element.

If pressure is applied to the lubricant material, it creates an outward force on the first part, the second part, the second side part, the third side part, and the fourth side part. This force is transmitted to the first sealing lip, the second sealing lip, the third sealing lip, and the fourth sealing lip. Thus, the first sealing lip and the second sealing lip are hereby pressed against the first groove. Accordingly, the third sealing lip and the fourth sealing lip are pressed against the second groove. This improves sealing along the first contact surface, the second contact surface the third contact surface, and the fourth contact surface.

An X-shaped cross section of the first element prevents bulging of the first side part, the second side part, the third side part, and the fourth side part, to the outside and increases therefore the resistance of the first element in regard to pressure.

The lubricant material conducting device can be aligned axially or radially. In an axially aligned lubricant material contacting device, the first element, the second element, and the third element are aligned axially, so that the lubricant material is guided in the axial direction, meaning parallel to the common symmetrical axis. Hereby, the first side part, the first sealing lip, the second side part, the second sealing lip, and the second element are positioned on another side of a radial plane, meaning orthogonal to the common symmetric axis, extending through the intermediate part, in reference to the third side part, the third sealing lip, a fourth side part, the fourth sealing lip, and the third element. Accordingly, also the third cavity and the fourth cavity are located at different sides of the plane. In addition, the second element and the third element are preferred to be mirror symmetrical in reference to the plane.

To enable install the lubricant material conducting device, the second element and/or the third element are at least designed as two parts, comprising at least a first part and a second part. The first part and the second part can be assembled through screws, gluing, or welding.

If the lubricant material conducting connection is aligned radially, the first element, the second element, and the third element are also aligned radially, so that the lubricant material is guided in an axial direction, meaning orthogonal to the common symmetric axis. A first area of the first element, comprising a first side part, the first sealing lip, the second side part and the second sealing lip, and the second element proceed hereby in the radial direction around a second area of the second element, and the third element, whereby the second area comprises the third side part, the third sealing lip, the fourth side part, and the fourth sealing lip. The intermediate part is positioned between the two areas of the first element.

Since the first element, the second element, and the third element are rotationally symmetric in reference to a common symmetrical axis, is it possible to rotate the first element in reference to the second element around a first rotational axis, and the second element in reference to the third element around a second rotational axis. The first rotational axis and the second rotational axis extend hereby along a common symmetric axis. Thus, the three axes are identical. In particular is it possible to rotate the first element in reference to the third element around the common symmetric axis, while the first side part and the second side part, as described above, engage into the first groove, and the third side part and the fourth side part, as described above, engage in the second groove.

Thus, the lubricant material conducting device is suitable to guide lubricant material between a first, rotating transmission part, and a second transmission part that is rotationally fixed in position. Accordingly, the first element of a preferred embodiment is designed in a way so that it can be mounted at a first transmission part, while the second element is designed in a way so that it is mounted at a second transmission part. Rotation of the first transmission part happens hereby around the common symmetrical axis. Also, a rotatable embodiment of the second transmission part is possible where the second transmission part also rotates around the common symmetric axis.

A second element, and with a first transmission part, and/or a third element and the second transmission part can each be different parts. Furthermore, embodiments are possible in which the second element, as one part, is connected with the first transmission part, and/or the third element, as one part, is connected with the second transmission part. Thus, the first transmission part creates the second element and/or the second transmission part creates the third element. Hereby, the first transmission part has the first groove, and/or the second transmission part has the second groove.

The pairing of the first transmission part and the second transmission part can be realized through a planetary carrier and an enclosure, a shaft, and an enclosure or a planetary carrier and a sun gear shaft. In particular, the transmission parts of a transmission can be parts of a wind power installation.

The first element and the second element, and/or the third element are preferably made of plastic. Especially preferred is an embodiment in which the first element, the second element, and the third element are manufactured with plastic material. Compared to the plastic-metal pairing according state-of-the-art, this reduces the wear along the first contact surface, the second contact surface and the third contact surface and the fourth contact surface. This improves the sealing of the device.

BRIEF DESCRIPTION OF THE DRAWINGS

The embodiment examples of the invention are further explained in the following drawings. Hereby, parts with matching reference characters have the same or same functional characteristics. It shows in particular.

DETAILED DESCRIPTION OF THE PREFERRED EMBODIMENTS

Figure 1:
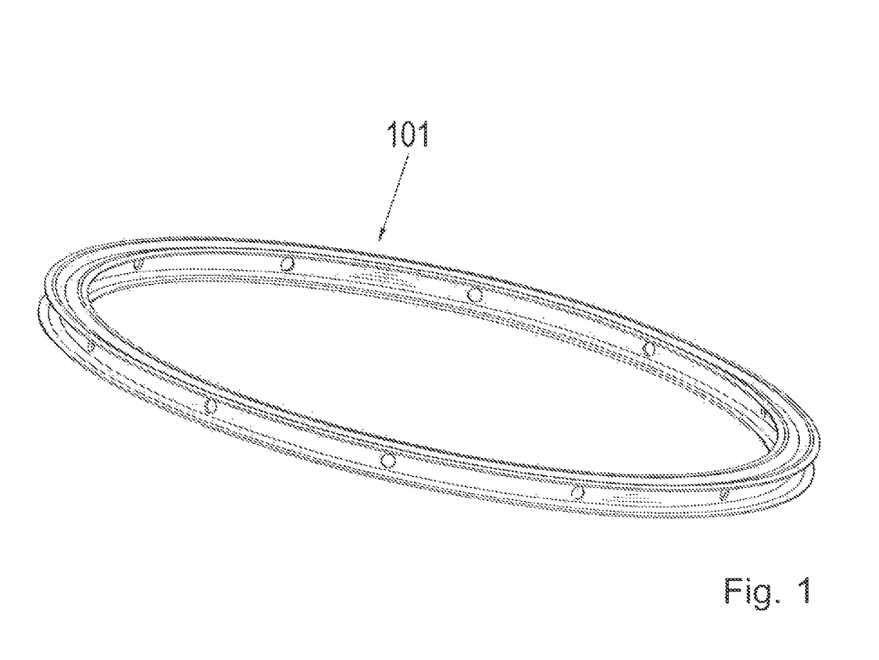
FIG. 1 a lubricant conducting X-Ring.

In FIG. 1, a perspective view is shown of a lubricant material conducting X-Ring 101. Its construction is illustrated and presented in the cross sectional view of FIG. 2.

Figure 2:
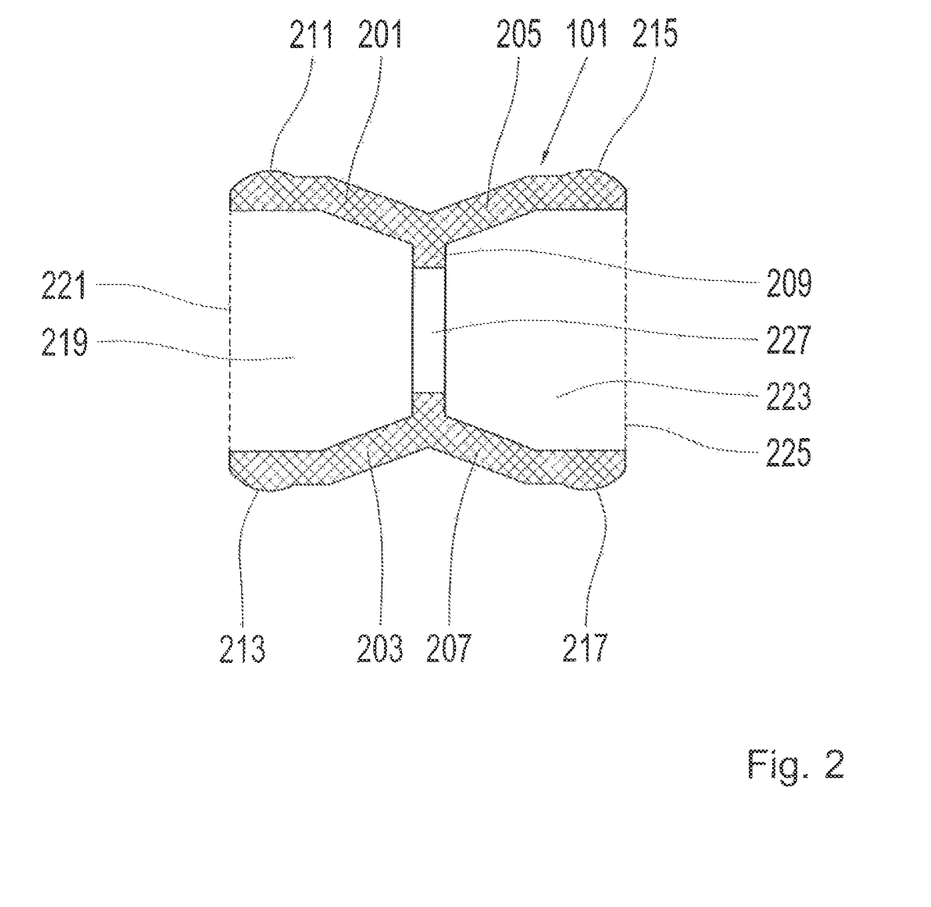
FIG. 2 the X-Ring as cross section cut.

The X-Ring 101 comprises of a first side part 201, a second side part 203, a third side part 205, a fourth side part 207 and a intermediate part 209. A first sealing lip 211 extends at the outer edge of the first side part 201, a second sealing lip 213 at the outer edge of the second side part 203, a third sealing lip 215 at the outer edge of the third side part 205, and a fourth sealing lip 217 and the outer edge of the fourth side part 207.

The first side part 201, the intermediate part 209, and the second side part 203 extend around a first cavity 219. The first sealing lip 211 and the second sealing lip 213 form an opening 221 of the first cavity 219.

The third side part 205, the intermediate part 209, and the fourth side part 207 extend around a second cavity 223. The third sealing lip 215 and the fourth sealing lip 217 form an opening 225 of the second cavity 223.

Figure 3:
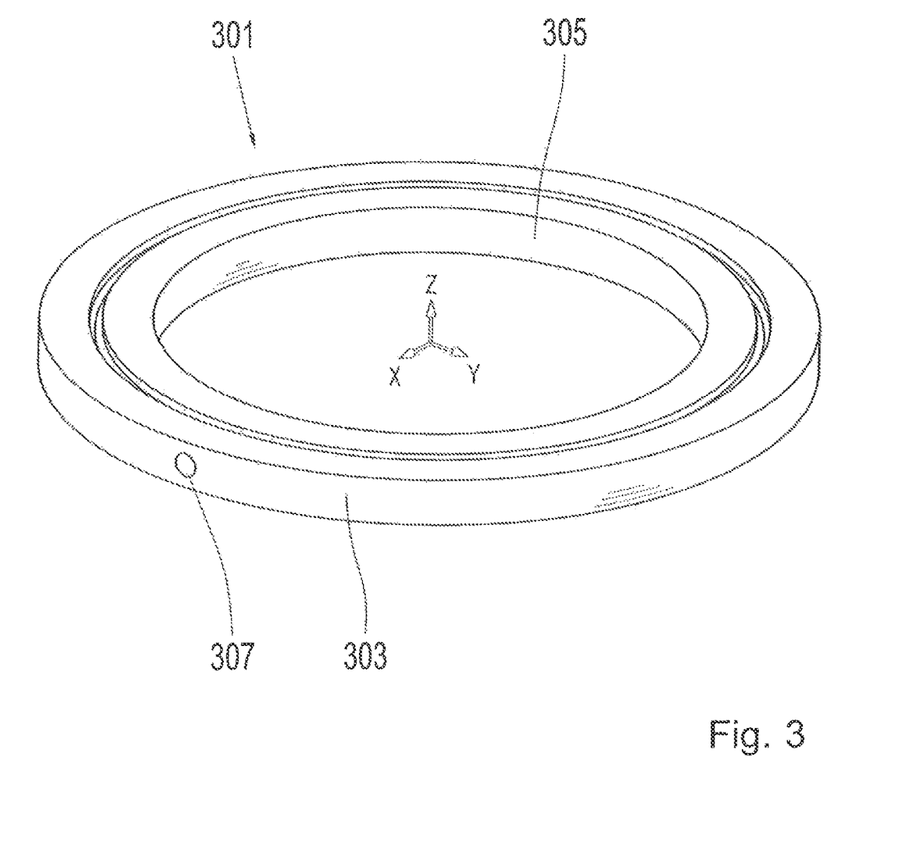
FIG. 3 the X-Ring with an inner and outer groove ring.

The intermediate part 209 has a plurality of through hole bores 227. Through the through hole bores 227, lubricant material can flow from the first cavity 219 into the second cavity 223 and from the second cavity 223 into the first cavity 219. Thus, the through hole bores 227 connect the first cavity 219 and the second cavity 223 in a lubricant conducting manner A lubricant material conducting device 301 is shown in the assembled state in FIG. 3. The lubricant material conducting device 301 comprises of an inner groove ring 305. The X-Ring 101 is positioned between the first groove ring 303 and the second groove ring 305 and is therefore not recognizable in FIG. 3. The first groove ring 303 has a through hole bore 307 for the inflow and/or outflow of lubricant material.

Figure 4:
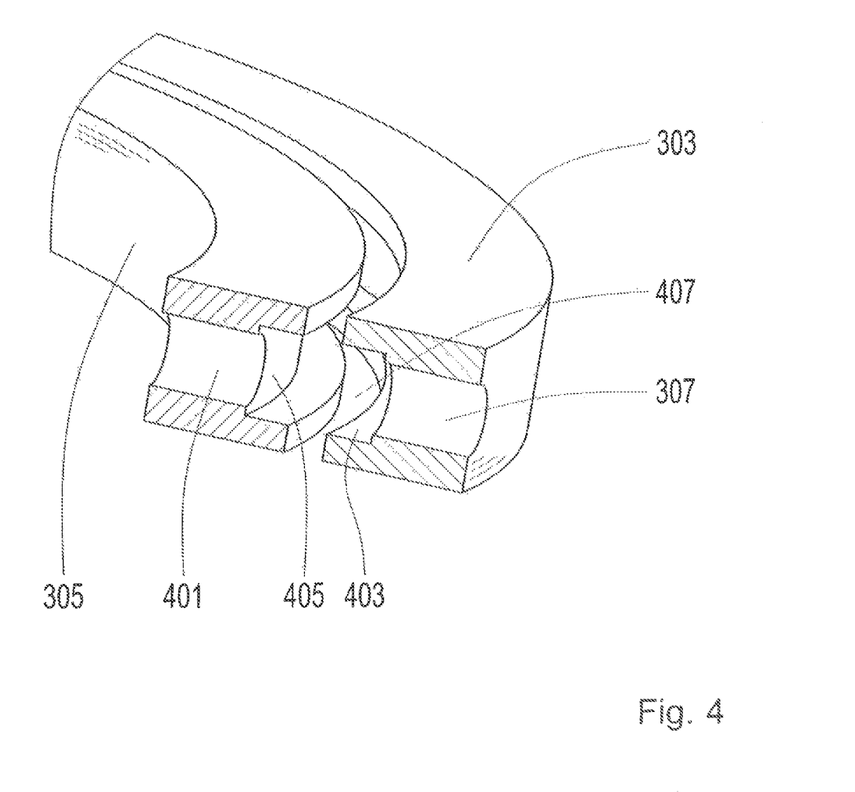
FIG. 4 a cross sectional view of the inner and outer groove ring.

The first groove ring 303 has at its inner side a first groove 403. Similarly, the second groove ring 305 has at its outer side a second groove 405. Thus, the first groove 403 is, in reference to the first groove ring 303, aligned to the inside while the second groove 405, in reference to the second groove ring 305 is aligned to the outside. Accordingly, the first groove 403 and the second groove 405 are aligned towards each other.

Figure 5:
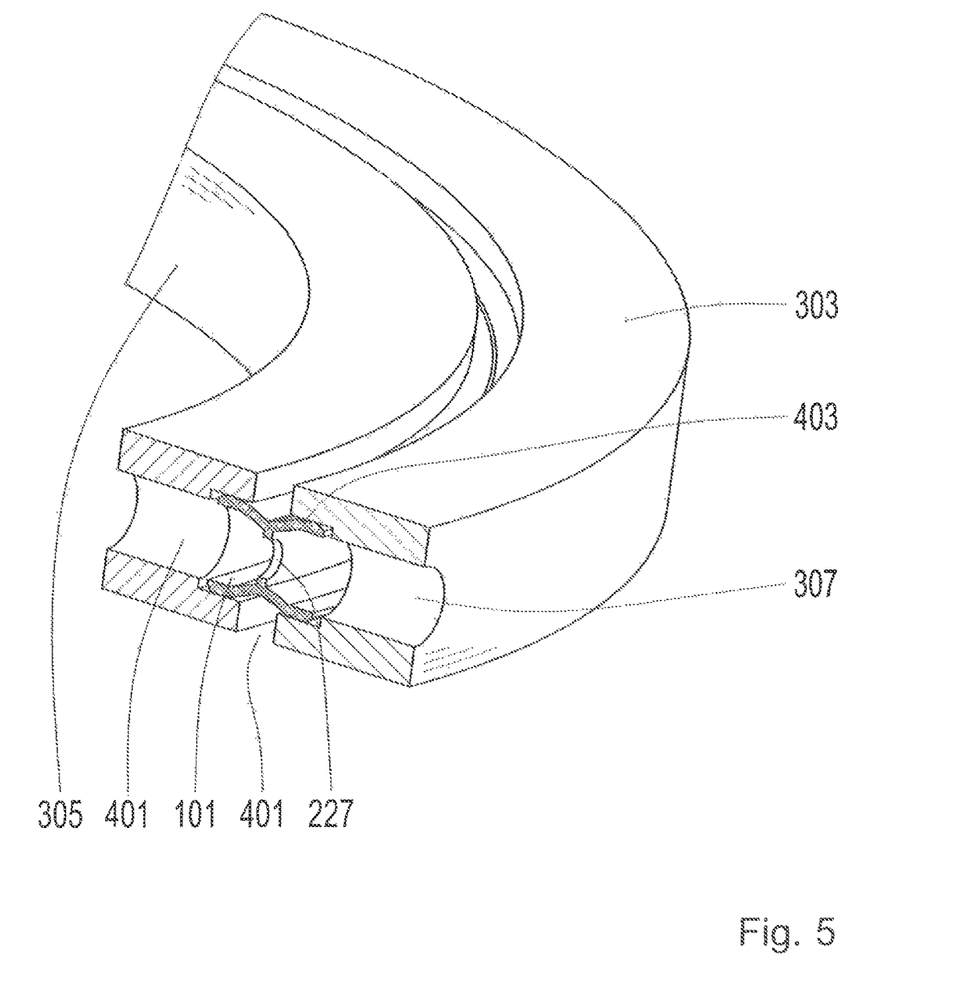
FIG. 5 a cross sectional view of the inner and the outer groove ring with the assembled X-Ring.

A gap 407 extends between the first groove ring 303 and the second groove ring 305. The X-Ring 101 as shown in FIG. 5, seals the gap 407 to the outside. The X-Ring 101 creates a lubricant material conducting connection between the through hole bore 307 in the first groove ring 303, the first groove 403, the second cavity 223, the through hole bores 227 of the X-Ring 101, the first cavity 219, the second groove 405, and the through hole bore 401 of the second groove ring 305. The lubricant material can flow through the through hole bore 307 of the first groove ring 303 into the first groove 403, from there into the second cavity 223, from there through the through hole bores 227 of the X-Ring 101 into the first cavity 219, from there into the second groove 205 and from there through the through hole bores 401 of the second groove ring 305. In reverse, the lubricant material can also flow through the through hole bores 401 of the second groove ring 305 into the second groove 405, from there into the first cavity 219, from there through the through hole bores 227 of the X-Ring 101 into the second cavity 223, from there into the first groove 403, and from their through the through hole bore 307 of the first groove ring 303.

The lubricant material conducting device 301 can be aligned radially or axially. FIG. 1 and FIGS. 3 to 5 show an X-Ring 101 or a lubricant material conducting device 301, respectively, in a radial alignment. However, FIG. 6 shows a lubricant material conducting connection 301 in an axial alignment.

The presentation of the cross section in FIG. 2 applies for an X-Ring 101 in a radial alignment, as well as in an axial alignment.

Figure 6:
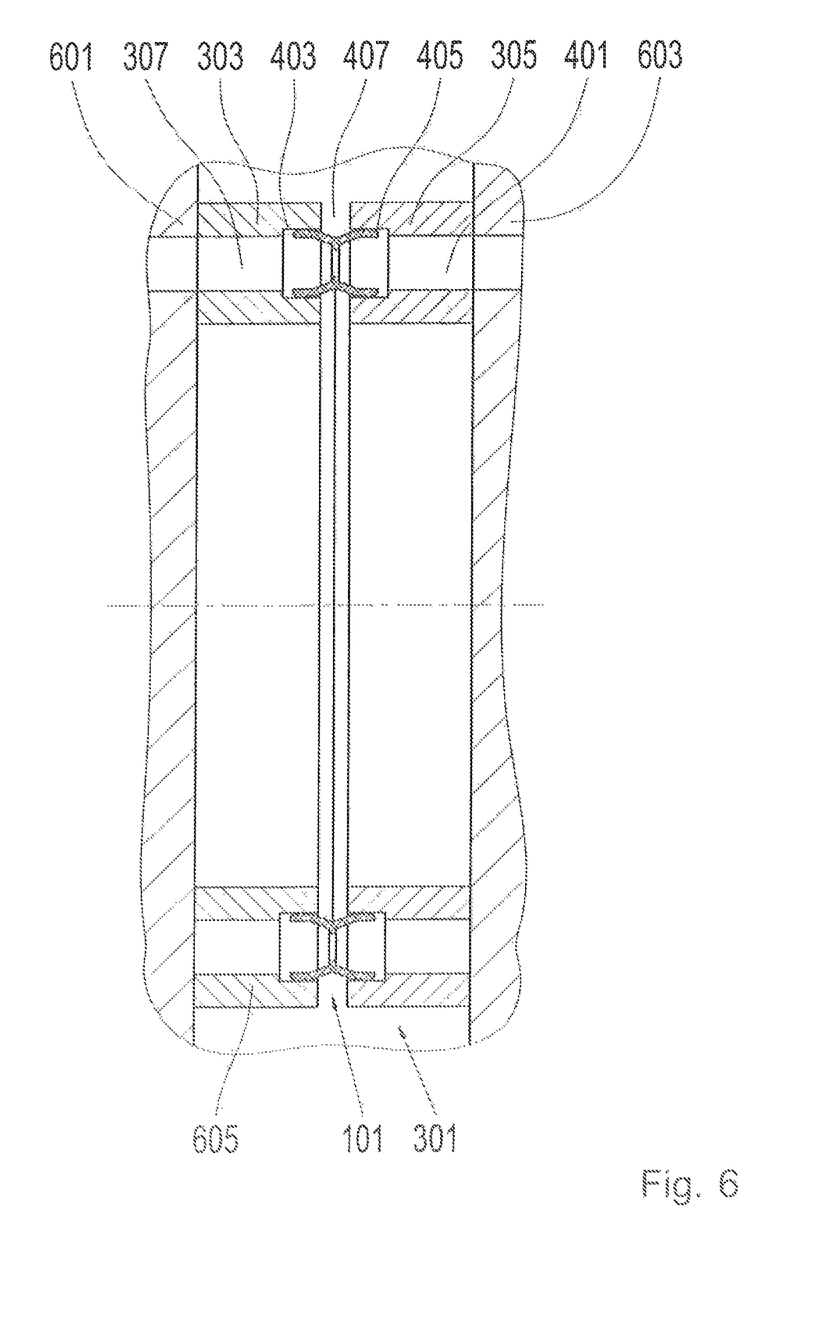
FIG. 6 an assembly in the axial direction.

The first transmission part 601 and a second transmission part 603 in accordance with FIG. 6 can be rotated in opposite directions. A gap 605 extends between the first transmission part 601 and the second transmission part 603 in the radial direction a lubricant material conducting device 301 is positioned in the gap 605.

The first groove ring 303 and the second groove ring 305 extend along a radial, meaning orthogonal in reference to the rotation axis of the first groove ring 303 and/or the second groove ring 305, centered and mirror symmetrical between the plane of the first groove ring 303 and the second groove ring 305. The first groove 403 is also aligned, like the second groove 405, sideways, meaning axial or parallel, respectively, to the rotational axis of the first groove ring 303 and/or the second groove ring 305. The X-Ring 101 seals the gap 407 to the outside which extends between the first groove ring 303 and the second groove ring 305. The lubricant material flow between the through hole bore 307, the first groove ring 303, and the through hole bore 401 of the second groove ring 305 happens as described above, however not in the radial direction but in the axial direction.

REFERENCE CHARACTERS

101 X-Ring
201 Side Part
203 Side Part
205 Side Part
207 Side Part
209 Intermediate part
211 Sealing Lip
213 Sealing Lip
215 Sealing Lip
217 Sealing Lip
219 Cavity
221 Opening
223 Cavity
225 Opening
227 Through hole Bore
301 Fixture
303 Groove Ring
305 Groove Ring
307 Through hole Bore
401 Through hole Bore
403 Groove
405 Groove
407 Gap
601 Transmission Part
603 Transmission Part
605 Gap

The invention claimed is:

1. A lubricant material conducting element comprising:
a first side part forming a first sealing lip;
a second side part forming a second sealing lip;
an intermediate part having at least one hole;
the first side part extending along a first sectional area to the intermediate part and the second side part extending along a second sectional area to the intermediate part;
the first side part, the second side part and the intermediate part forming a first cavity with a first opening different than the hole;
a third side part forming a third sealing lip;
a fourth side part forming a fourth sealing lip;
the third side part extending along a third sectional area to the intermediate part and the fourth side part extending along a fourth sectional area to the intermediate part;
the third side part, the fourth side part and the intermediate part form a second cavity with a second opening different than the hole;
the hole connecting the first cavity with the second cavity to facilitate lubricant flow therebetween;
the first side part, the second side part, the third side part, the fourth side part, the first sealing lip, the second sealing lip, the third sealing lip, the fourth sealing lip, the intermediate part, the first sectional area, the second sectional area, the third sectional area, the fourth sectional area, the first cavity, the second cavity, the first opening, and the second opening all extending rotationally symmetric around a common symmetric axis;
a dimension of the first cavity from the first side part to the second side part being greatest at the first opening, and a dimension of the second cavity from the third side part to the fourth side part being greatest at the second opening;
wherein the first opening extends between the first sealing lip and the second sealing lip, and the second opening extends between the third sealing lip and the fourth sealing lip; and the intermediate part being planar and extending parallel to the first and the second openings.

2. The element according to claim 1, wherein the first opening and the second opening each have a form of a circumferential surface.

3. The element according to claim 1, wherein the first opening and the second opening have a form of a circular ring.

4. The element according to claim 1, wherein the element is at least partially formed from a plastic material.

5. The element according to claim 1, wherein the element is at least partially formed from a metal.

6. The element according to claim 1, wherein the first sealing lip, the second sealing lip, the third sealing lip and the fourth sealing lip are plastic.

7. A lubricant material conducting device comprising:
a first element having:
  a first side part forming a first sealing lip;
  a second side part forming a second sealing lip;
  an intermediate part having at least one hole;
  the first side part extending along a first sectional area to the intermediate part and the second side part extending along a second sectional area to the intermediate part;
  the first side part, the second side part and the intermediate part forming a first cavity with a first opening different than the hole;
  a third side part forming a third sealing lip;
  a fourth side part forming a fourth sealing lip;
  the third side part extending along a third sectional area to the intermediate part and the fourth side part extending along a fourth sectional area to the intermediate part;
  the third side part, the fourth side part and the intermediate part forming a second cavity with a second opening different than the hole;
  the hole connecting the first cavity with the second cavity to facilitate lubricant flow therebetween;
  a dimension of the first cavity from the first side part to the second side part being greatest at the first opening, and a dimension of the second cavity from the third side part to the fourth side part being greatest at the second opening;
a second element having a first groove;
a third element having a second groove;
at least a lubricant material conducting connection extending through the second element and leading into the first groove;
at least a lubricant material conducting connection extending through the third element and leading into the second groove, the first side part and the second side part engaging with the first groove, the first sealing lip, along a first contact surface, abutting with the first groove, and the second sealing lip, along a second contact surface, abutting with the first groove;
the third side part and the fourth side part engaging in the second groove in a way that the third sealing lip, along a third contact surface, abutting with the second groove, and the fourth sealing lip, along a fourth contact surface, abutting with the second groove;
the first side part, the second side part, the third side part, the fourth side part, the first sealing lip, the second sealing lip, the third sealing lip, the fourth sealing lip, the intermediate part, the first sectional area, the second sectional area, the third sectional area, the fourth sectional area, the first cavity, the second cavity, the first opening, the second opening, the first groove, the second groove, the first contact surface, the second contact surface, the third contact surface, and the fourth contact surface all extending rotationally symmetric around a common symmetric axis; and wherein the first opening extends between the first sealing lip and the second sealing lip, and the second opening extends between the third sealing lip and the fourth sealing lip; and the intermediate part being planar and extending parallel to the first and the second openings.

8. The device according to claim 7, wherein at least one of:
the second element is attached to a first transmission part, and
the third element is attached to a second transmission part.

9. The device according to claim 7, wherein at least one of the second element and the third element is plastic.

10. A lubricant material conducting element consisting of:
a first side part having one end formed as a first sealing lip, a second side part having one end formed as a second sealing lip, and opposed ends of the respective first and second side parts are integral with an intermediate part which has at least one hole;
the first side part, the second side part and the intermediate part forming a first cavity, the first cavity having a first opening that is opposite the at least one hole in the intermediate part and that is defined by the first and the second sealing lips;

a third side part having one end formed as a third sealing lip; a fourth side part having one end formed as a fourth sealing lip, opposed ends of the respective third side part and fourth side part are integral with the intermediate part;

the third side part, the fourth side part and the intermediate part forming a second cavity, the second cavity having a second opening that is opposite the at least one hole in the intermediate part and that is defined by the third and the fourth sealing lips, the at least one hole in the intermediate part connecting the first cavity and the second cavity with one another to facilitate flow of lubricant material therebetween; and the first side part, the second side part, the third side part, the fourth side part, the first sealing lip, the second sealing lip, the third sealing lip, the fourth sealing lip, the intermediate part, the first cavity, the second cavity, the first opening, and the second opening all being rotationally symmetric around a common symmetric axis;

a dimension of the first cavity from the first side part to the second side part being greatest at the first opening, and a dimension of the second cavity from the third side part to the fourth side part being greatest at the second opening; and the intermediate part being planar and extending parallel to the first and the second openings.

* * * * *